United States Patent [19]

Allen et al.

[11] Patent Number: 4,625,989

[45] Date of Patent: Dec. 2, 1986

[54] TRACTOR/IMPLEMENT HITCH

[75] Inventors: James R. Allen, Valley Mills, Tex.;
William P. Wohlford, Bettendorf, Iowa; Bernard B. Poore, East Moline, Ill.

[73] Assignee: Deere & Company, Moline, Ill.

[21] Appl. No.: 809,592

[22] Filed: Dec. 16, 1985

[51] Int. Cl.[4] .............................................. B60D 1/04
[52] U.S. Cl. ................................. 280/479 A; 280/504; 172/272
[58] Field of Search ........... 280/479 A, 479 R, 478 R, 280/477, 415 R, 415 A, 504, 514; 172/275, 272

[56] References Cited

U.S. PATENT DOCUMENTS 3,524,660 8/1970 Kew et al. ....................... 280/278 R
4,176,852 12/1979 Collin ............................... 280/415 A
4,368,899 1/1983 Smalley et al. ................. 280/478 R Primary Examiner—John A. Pekar

[57] ABSTRACT

A drawbar pickup system includes a drawbar in the form of a shaft rotatably coupled between aft ends of a pair of draft links, and a latch fixed to the shaft to define an aperture therebetween. A hook is fixed to an implement tongue so that it opens towards the drawbar. The drawbar is rotatable to a position wherein the hook can be inserted into and removed from the aperture and to a position wherein the latch member engages the bight portion of the hook to prevent separation of the hook from the drawbar. A locking mechanism is operable to rotate the drawbar and to releasably hold the drawbar in its positions.

10 Claims, 11 Drawing Figures

TRACTOR/IMPLEMENT HITCH

BACKGROUND OF THE INVENTION

The present invention relates to a hitch mechanism for coupling an implement tongue to the draft links of a vehicle hitch.

It can be difficult for a lone operator to connect an implement to a tractor drawbar. This is because the lone operator must leave the tractor cab, lift and position the implement tongue and then insert the drawbar pin. The task is simplified if a second person can assist, but the second person must perform his task in the relatively hazardous area between the tractor and the implement.

Existing drawbar pickup systems are expensive and/or perform only with certain machine combinations. Conventional three-point hitches have the ability and the capacity to perform a drawbar pickup function. Therefore, it would be desirable to provide a pickup type hitch system which could utilize this capability.

SUMMARY

An object of this invention is to provide a drawbar pickup type hitch system which utilizes the capability of a conventional three-point hitch system.

This and other objects are achieved by the present invention which includes a drawbar which extends transversely between the aft ends of the draft links of a three-point hitch. The drawbar is rotatable and has a latch member fixed thereto which defines a hook receiving aperture. A hook is fixed to the upper surface of the implement tongue. The hook is open towards the drawbar so that the point of the hook may be received by the aperture and so that the hook may receive the drawbar. A locking device at one end of the drawbar is operable to rotate the drawbar between its coupled and uncoupled positions. The locking device includes a bracket which is spring biassed into engagement with part of the draft link to releasably prevent rotation of the drawbar.

DETAILED DESCRIPTION

Figure 1:
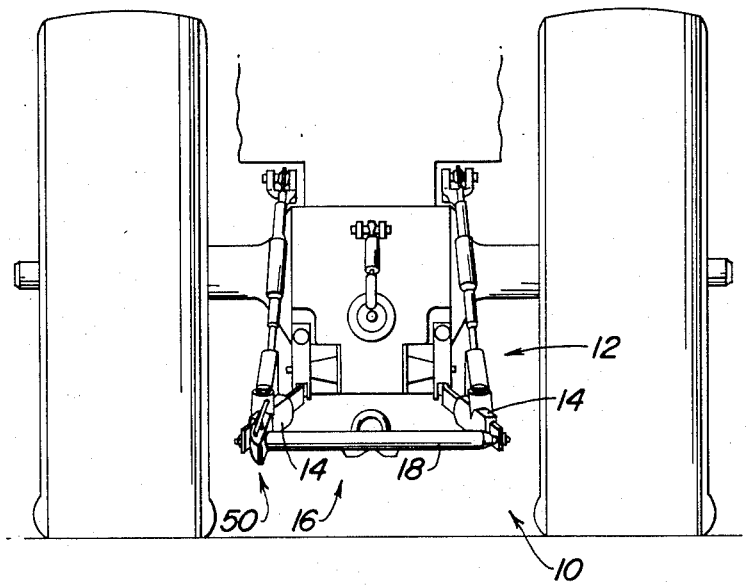
FIG. 1 is a view of the rear of a tractor showing the drawbar of the present invention coupled to the draft links of a conventional three-point hitch.

In FIG. 1, there is shown the rear of a conventional tractor 10 with a conventional three-point hitch 12 including a pair of rearward extending draft links 14. The hitch bar 16 of the present invention is rotatably supported by the aft ends of the draft links 14.

Figure 2:
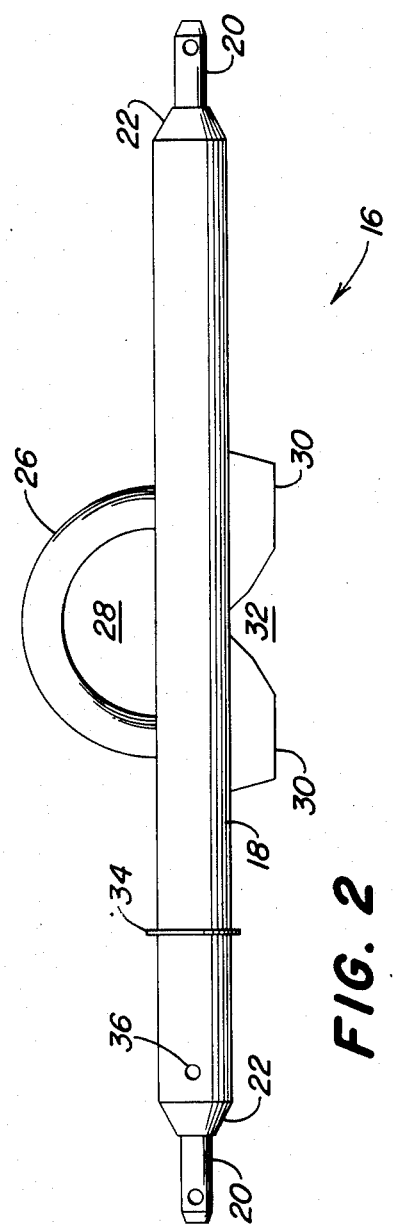
FIG. 2 is a side view of the drawbar of the present invention.

As best seen in FIG. 2, the hitch bar 16 is formed of a cylindrical bar 18 joined at its ends to reduced diameter sections 20 via tapered portions 22. Ends 20 are rotatably received in corresponding bores in the ends of the draft links 14 and retained therein by pins (not shown). A curved bar 26 is fixed to the bar 18 and encloses a coupling aperture 28. A pair of guide members 30 project from bar 18 opposite bar 26 and define a guide slot 32 therebetween. An annular ring 34 is fixed near one end of the bar 18 and a bore 36 extends through the bar 18 between the ring 34 and that one end.

Figure 3:
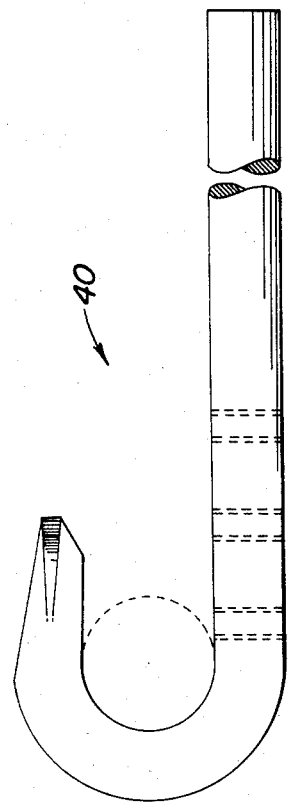
FIG. 3 is a view of the hook of the present invention.
Figure 4:
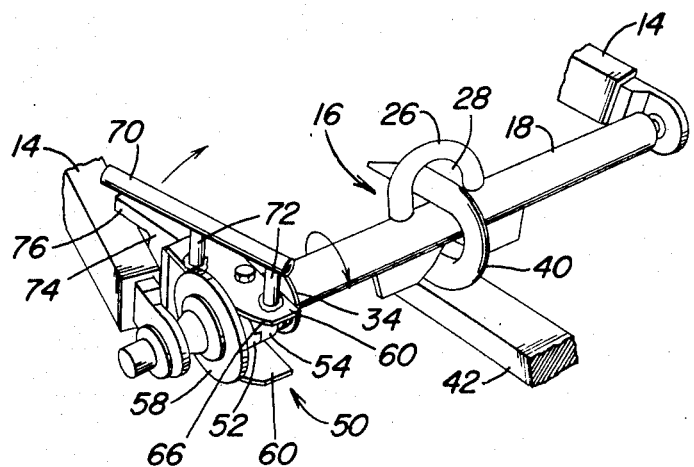
FIG. 4 is a view of the present invention with the drawbar positioned to receive the hook.
Figure 5:
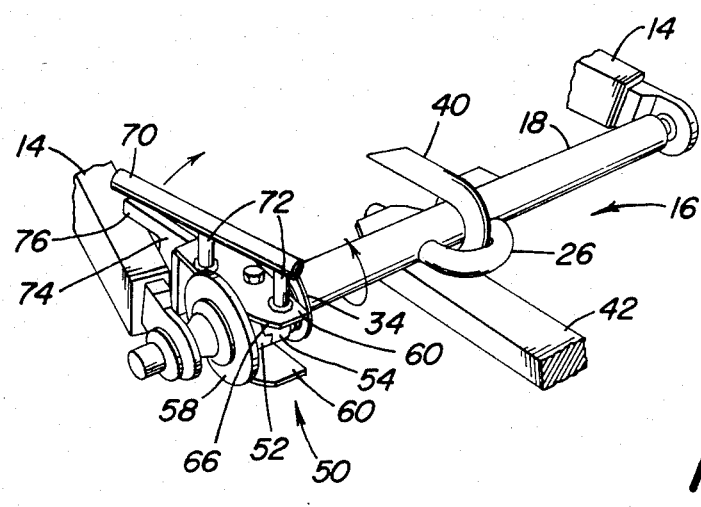
FIG. 5 is a view of the present invention with the drawbar in the locked position.
Figure 8:
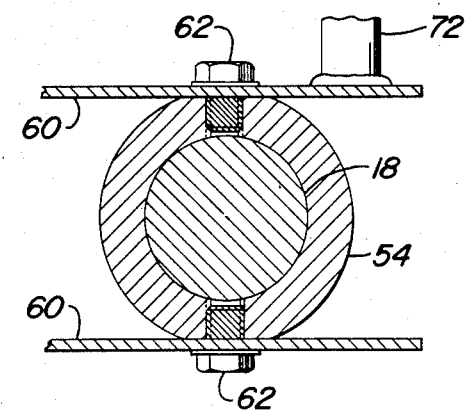
FIG. 8 is a cross-sectional view along lines 8—8 of FIG. 6.

As best seen in FIGS. 3–5, a hook 40 has a base which is bolted to the upper surface of the tongue 42 of the implement (not shown) so that the hook is open in the forward direction (towards draft links 14) and so that its point can be inserted through the aperture 28.

Figure 9:
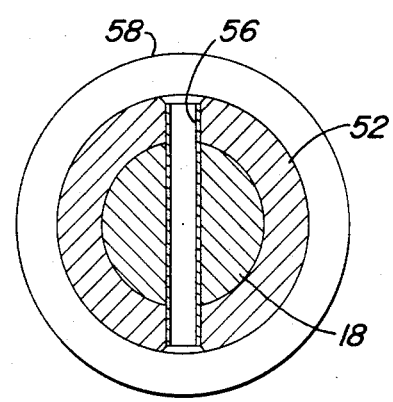
FIG. 9 is a cross-sectional view along lines 9—9 of FIG. 7.
Figure 10:
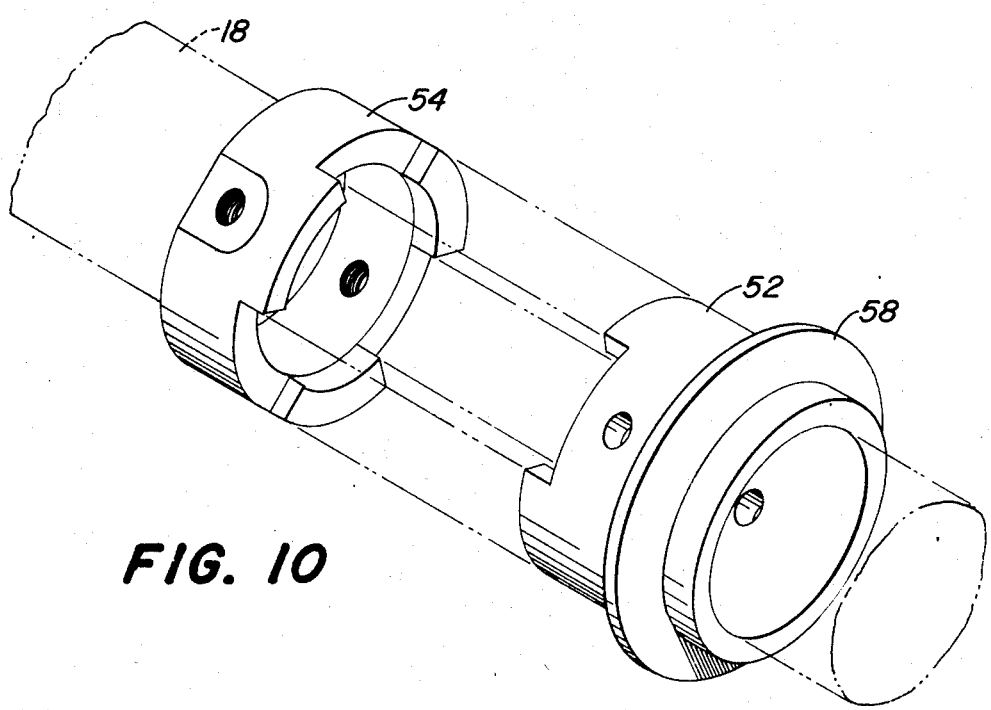
FIG. 10 is a view showing the meshing function of the inner and outer hubs of the locking device of the present invention.

The hitch system also includes a pivot/latch mechanism 50. The pivot/latch mechanism 50 includes a pair of hollow cylindrical hubs 52 and 54 with meshing axially projecting teeth as best seen in FIG. 10. As best seen in FIG. 9, the outer hub 52 is fixed on bar 18 via a press-fit pin 56 and has a flange 58 projecting radially therefrom.

Figures 6, 7:
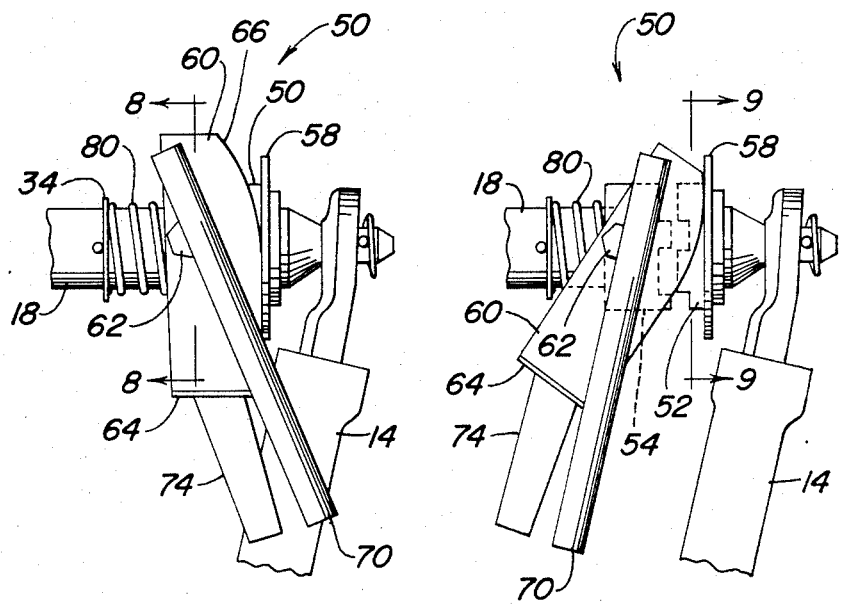
FIGS. 6 and 7 are views of the locking mechanism of the present invention in the locked and unlocked positions, respectively.
Figure 11:
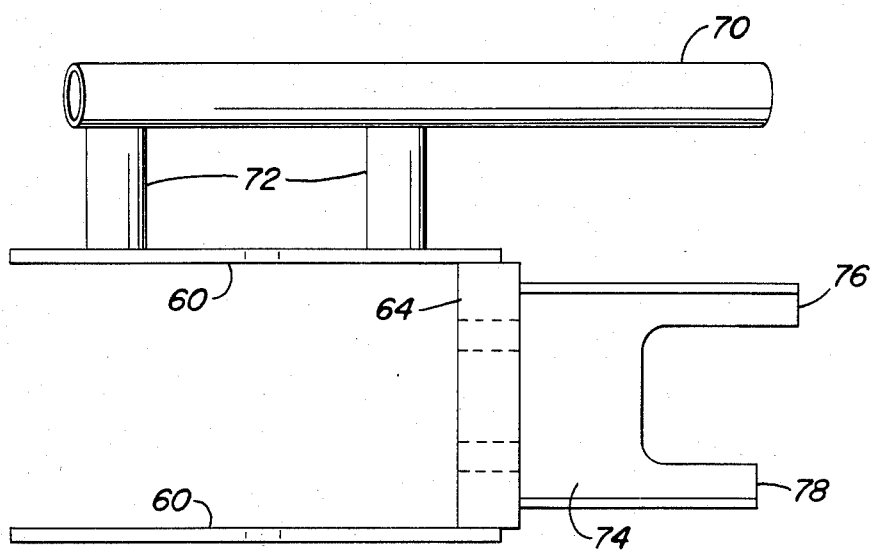
FIG. 11 is a view of the lever, carry plate and locking bracket of the locking device of the present invention.

The inner hub 54 is mounted for rotation and for axial sliding on bar 18. A lever/latch device includes cam plates 60 which are pivotally coupled to hub 54 via bolts 62 which are received by threaded bores in opposite sides of the hub 54. A front plate 64 extends between the cam plates 60. The cam plates 60 have identical curved cam surfaces 66 which engage the flange 58 of the outer hub 52. An operating lever 20 is fixed to the upper cam plate 64 via a pair of legs 72. A bracket 74 is fixed to front plate 64 and includes a longer upper leg 76 and a shorter lower leg 78, as best seen in FIG. 11. The legs 76 and 78 are spaced apart to receive a portion of the draft links 14, as seen in FIGS. 4, 5 and 6.

A coil spring 80 is mounted on rod 18 between ring 34 and inner hub 54 and is biassed to urge hub 54 towards hub 52.

MODE OF OPERATION

To couple the bars 18 and 76 to the hook 40, the tongue 42 may be rested on the ground while the draft links 14 are lowered and moved rearward with the bars 18 and 26 in the position shown in FIG. 4. When the hook 40 has been fully received by the aperture 28 (and hook 40 fully received bar 18), the draft links 14 may be raised to an operating height suitable for the particular implement (not shown). The slanted walls of slot 32 cooperate with the shank of hook 40 to help align the point of hook 40 with the aperture during this operation.

When the hook 40 is fully received by aperture 28, the operator can grasp lever 70 and pivot bracket about the axis of bolts 62 just until the lower leg 74 is clear of the draft link 14, at which point the teeth of hubs 52 and 54 are still partly intermeshed. The operator then lifts lever 70 and rotates the lever/latch mechanism 50 and the hitch bar 16 clockwise (viewing FIG. 4) 90 degrees so that the bars 18 and 26 are in the position shown in FIG. 5 wherein bar 26 is to the rear of bar 18, thus preventing the hook 40 from being uncoupled from bar 18. At this point, the lever 70 is pivoted further about the axis of bolts 62 until the teeth of hubs 52 and 54 are completely disengaged from each other. This permits lever 70, plates 60, bracket 74 and hub 54 to be rotated counterclockwise 90 degrees about the axis of bar 18 while the bars 18 and 26 remain in the position shown in FIG. 5. The lever 70 and the cam plates 60 are now in the position shown in FIG. 7. The lever 70 is then released so that the spring 80 causes cam plates 60 and bracket to pivot about the axis of bolts 62 so legs 76 and 78 grasp the draft link 14, thus maintaining the mechanism in the coupled position shown in FIG. 5.

To uncouple the hook 40 from bars 18 and 76, this operation is performed in reverse.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A hitch system for connecting an implement tongue to vehicle draft links, the hitch system comprising:
    a hook opening toward the draft links, the hook having a base rigidly fixed to the tongue and an end connected to the base via a bight portion;
    a drawbar comprising a shaft rotatably coupled to and extending between aft ends of the draft links; and
    a latch member fixed with respect to the drawbar, the latch member and the drawbar cooperating to define a hook-receiving aperture, the drawbar and latch member being rotatable from a hook-receiving position wherein the end of the hook may be moved through said aperture and wherein the hook receives the drawbar to a coupled position wherein the aperture receives the bight portion of the hook and wherein the latch member is engaged with the bight portion of the hook to prevent the hook from being moved away from the drawbar.

2. The hitch system of claim 1, further comprising:
    locking means for releasably preventing rotation of the drawbar and latch member.

3. The hitch system of claim 2, wherein the locking means comprises:
    a flange projecting radially from the drawbar;
    a pair of interlocking hubs, one hub being fixed with respect to the drawbar, the other hub being mounted on the drawbar for rotation and axial movement with respect to the drawbar, the hubs having complimentary teeth for meshing engagement with each other;
    a cam member pivotally coupled to the one hub, the cam member having a cam surface engaging the flange so that pivoting of the cam member causes axial movement of the one hub into and out of meshing engagement with the other hub; and
    resilient means for urging the one cam hub towards the other hub.

4. The hitch system of claim 3, wherein:
    the cam member comprises a bracket releasably engageable with one of the draft links to prevent rotation of the cam member, of the hubs, of the drawbar and of the latch member about the axis of the drawbar.

5. The hitch system of claim 2, wherein:
    the locking means includes a bracket with a pair of arms defining an opening therebetween, the opening receiving a portion of one of the draft links when the locking means is in a locked position.

6. A drawbar pickup system for connecting an implement tongue to vehicle draft links, the drawbar pickup system comprising:
    a drawbar comprising a shaft rotatably coupled to and extending transversely between aft ends of the draft links, the drawbar also comprising a latch member fixed to the shaft cooperating therewith to define an aperture therebetween; and
    a hook having a base fixed to the tongue and an end joined to the base by a bight portion, the hook being open towards the drawbar, the drawbar being rotatable to a first position wherein the end of the hook may be inserted into and removed from the aperture and to a second position wherein bight portion is received by the aperture and wherein the latch member is engageable with the bight portion to prevent separation of the hook and drawbar.

7. The drawbar pickup system of claim 6, further comprising:
    locking means engageable with a portion of one of the draft links for preventing rotation of the drawbar.

8. The drawbar pickup system of claim 7, wherein the locking means comprises:
    a flange projecting radially from the shaft;
    a first hub fixed with respect to the shaft and having a plurality of axially extending teeth;
    a second hub mounted on the shaft adjacent the first hub and having a plurality of teeth for meshing engagement with the teeth of the first hub, the second hub being rotatable and axially movable with respect to the shaft;
    a cam member pivotally coupled to the second hub via a pivot having a radially extending pivot axis, the cam member having a curved cam surface engaging the flange so that pivoting of the cam member about said pivot causes axial movement of the second hub into and out of meshing engagement with the first hub; and
    a resilient member biassed to urge the second hub towards the first hub.

9. The drawbar pickup system of claim 8, further comprising:
    a lever arm fixed to the cam member and operable to rotate the cam member, both hubs and the drawbar about the axis of the shaft when the hubs are in meshing engagement and operable to rotate only the cam member and the second hub about the shaft axis when the hubs are unmeshed.

10. The drawbar pickup system of claim 9, further comprising:
    a bracket fixed to the cam member and having arms engageable with one of the draft links to prevent rotation of the cam member, hubs and drawbar about the axis of the shaft.

* * * * *